May 17, 1949.
G. A. FRY
2,470,156
CONTRAST MEASURING APPARATUS HAVING RELATIVELY
ROTATABLE POLARIZING ELEMENTS FOR
OPTICAL SIGHTING INSTRUMENTS
Filed Sept. 6, 1945
2 Sheets-Sheet 1
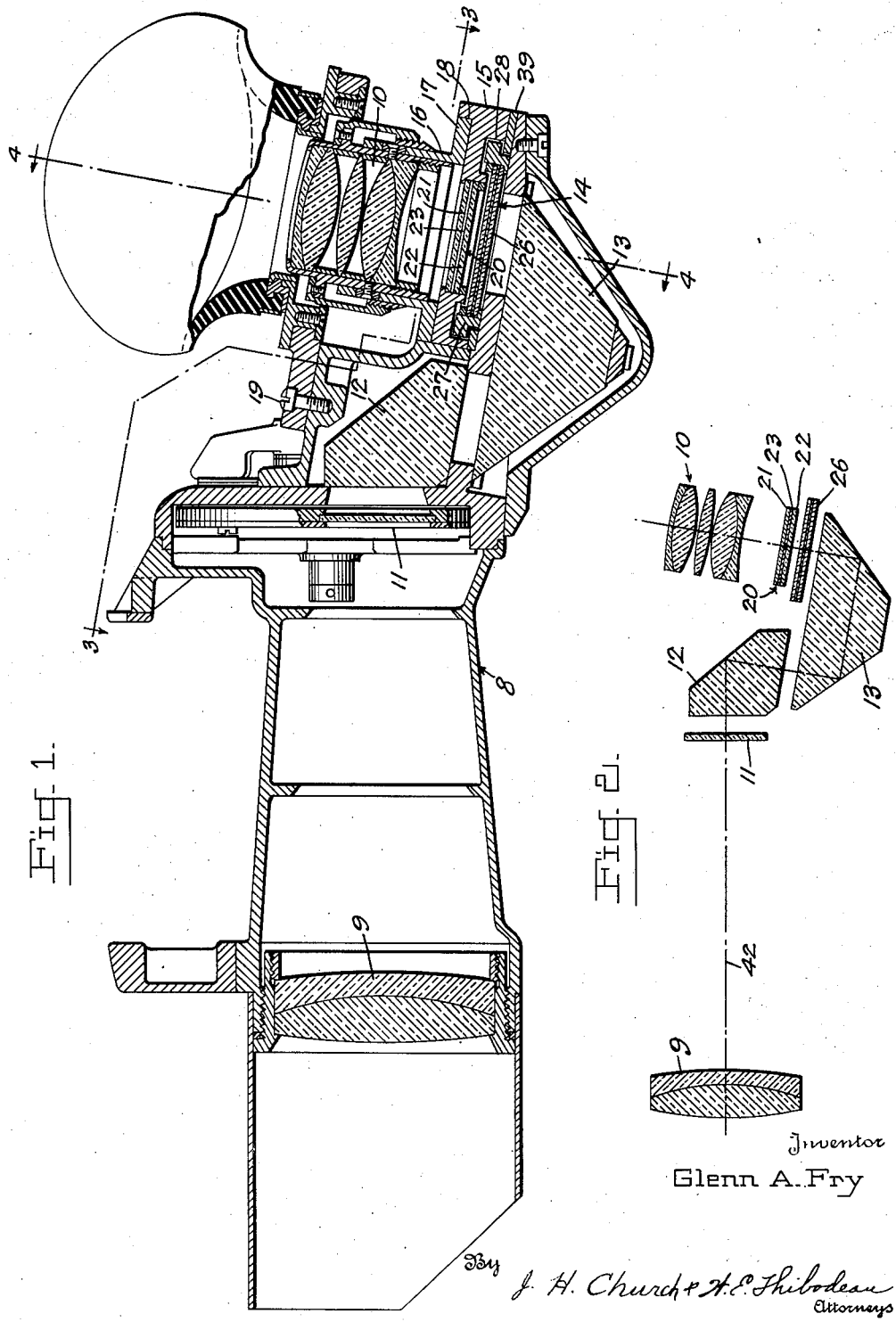
Inventor
Glenn A. Fry
By J. H. Church & H. E. Thibodeau
Attorneys

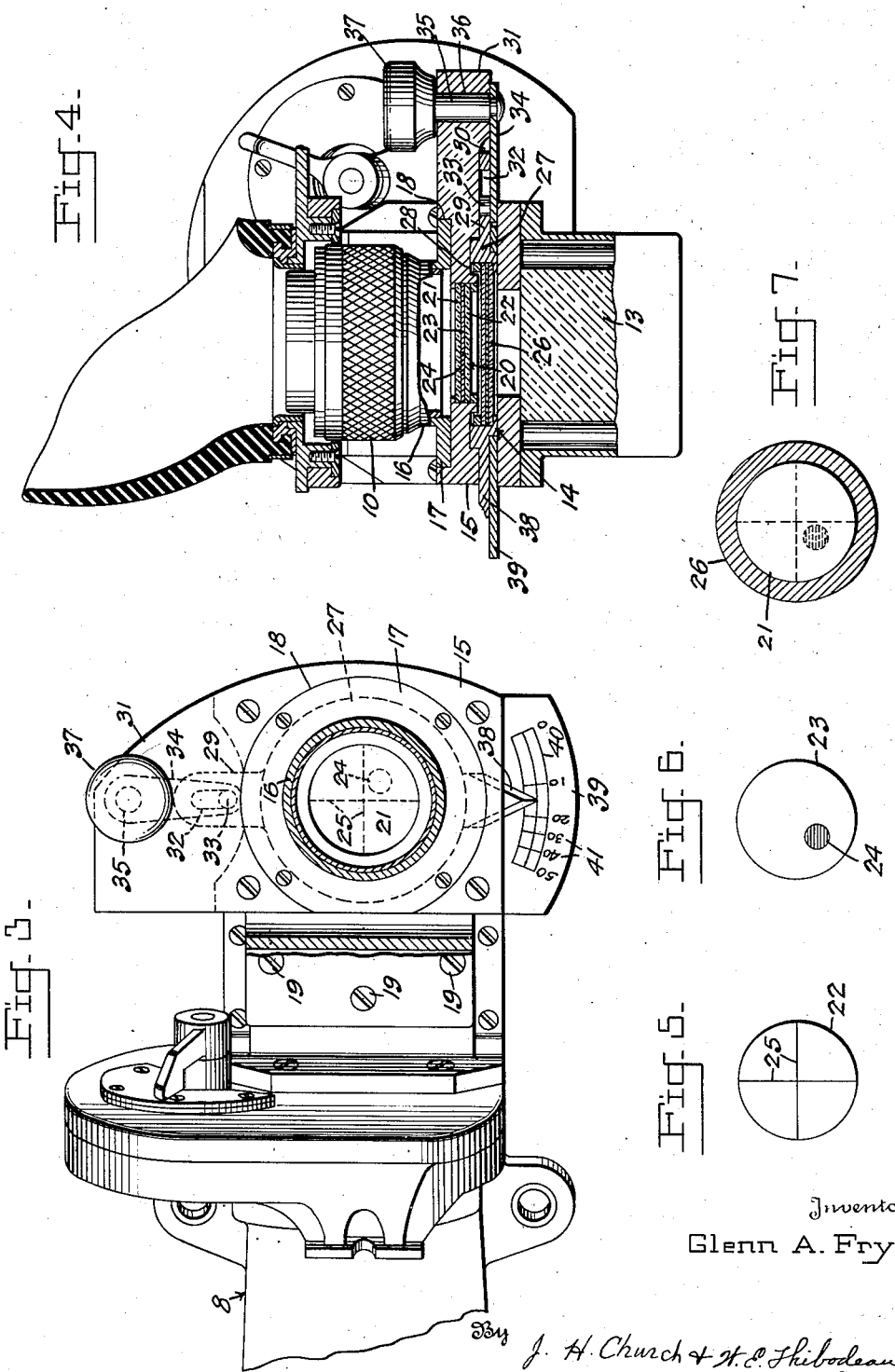

Patented May 17, 1949

2,470,156

UNITED STATES PATENT OFFICE 2,470,156

CONTRAST MEASURING APPARATUS HAVING RELATIVELY ROTATABLE POLARIZING ELEMENTS FOR OPTICAL SIGHTING INSTRUMENTS

Glenn A. Fry, Columbus, Ohio, assignor to the United States of America as represented by the Secretary of War Application September 6, 1945, Serial No. 614,740

1 Claim. (Cl. 88—23)

This invention relates to an apparatus for use in the measurement of the contrast between an object, such as an aeroplane, and its uniform unrestricted background, such as the sky.

More particularly, it is an object of the invention to provide an apparatus of the above described nature which is especially designed and adapted for use in conjunction with a tracking telescope of a height finder such as the Army's type M2, but the principle of which could be readily adapted to various types of optical instruments including telescopes and microscopes, for measuring the contrast of an object, being viewed through such instruments, which has an unrestricted, uniform background.

More specifically, it is an aim of the invention to provide an apparatus, such as previously mentioned, which is capable of being embodied in an attachment which is so constructed that it may be supported by the unit containing the reticle holder of a tracking telescope and which may be assembled to the eyepiece assembly, and in conjunction therewith, mounted as a unit on a tracking telescope.

Other objects and advantages of the invention will hereinafter become more fully apparent from the following description of the drawings, which illustrate a preferred embodiment of the invention, and wherein:

Figure 1 is a longitudinal substantially central sectional view of an elbow tracking telescope such as the Army's type M13, which is used in conjunction with a height finder of the aforesaid type M2, and to which the invention is shown applied;

Figure 2 is a sectional view of the optical system of the telescope and showing the location of the invention therein;

Figure 3 is a sectional view, partly in top plan, taken substantially along a plane as indicated by the line 3—3 of Figure 1;

Figure 4 is a transverse sectional view through the eyepiece taken substantially along a plane as indicated by the line 4—4 of Figure 1;

Figure 5 is a bottom plan view of a part of the invention;

Figure 6 is a top plan view of another part thereof; and

Figure 7 is a view showing the reticle, constituting the invention, as it will appear to an observer looking through the eyepiece of the telescope.

Referring more particularly to the drawings, wherein like reference characters designate like or corresponding parts throughout the several views, for the purpose of illustrating one application of the invention, an elbow tracking telescope of type M13, designated generally 8, includes an object lens 9 which is located in the end thereof, opposite to the eyepiece 10 of the telescope. Between the objective lens 9 and the eyepiece 10 is located a filter holder 11 and between said filter holder and the eyepiece the telescope is provided with a roof prism 12 and a Porro prism 13, the latter being positioned between the roof prism and the eyepiece and beneath both of said parts. The parts, previously described, are all of conventional construction and arrangement in the elbow tracking telescope 8 and form no part of the present invention.

The contrasting meter attachment, designated generally 14, and which comprises the invention, is mounted in the reticle holder 15 of the telescope 8 and replaces the reticle with which the telescope 8 is ordinarily equipped. The eyepiece 10 includes a sleeve 16 having a flanged end 17 which seats in a recess 18 of the reticle holder 15 to provide a connection between the reticle holder and eyepiece; and the eyepiece is attached to the telescope 8 by means of a plurality of screw fastenings 19 for detachably mounting the unit, composed of the eyepiece 10 and reticle holder 15, on the telescope 8.

The contrast meter attachment 14 includes a reticle, designated generally 20, which is composed of an upper disk of transparent material 21 and a lower disk of transparent material 22 which disks are preferably formed of glass; and a disk or sheet of film 23 which is mounted between the disks 21 and 22. The film 23, as best seen in Figure 6, is provided with a polarizing area 24 which is located off center thereof and which polarizes the light, passing therethrough, in one direction. The polarizing area 24 is contained in the photographic emulsion on the side of the film 23 which is in contact with the lower transparent disk 22. The under side of the lower reticle disk 22 is provided with cross lines 25 which are engraved thereon and which intersect at the center thereof, as seen in Figure 5. Said cross lines provide means by which the reticle 20 can be used in conjunction with the telescope 8 for adapting the instrument for use as a tracking telescope in addition to functioning as a contrast meter.

An analyzer or filter 26 is mounted in the reticle holder 15 and beneath the reticle 20, and said filter 26 is likewise polarizing in one direction and is provided with a frame 27 which is disposed around the edge of the filter 26 and which is rotatably disposed in an annular recess 28 of the reticle holder 15. The frame 27 is provided with an extension 29 which projects outwardly from a portion of the circumference thereof and which is disposed in a recess 30 of a lug 31, which forms an integral extended portion of the reticle holder 15, as best seen in Figures 3 and 4. The extension 29 is provided with an elongated radially-extending slot 32 which is disposed lengthwise thereof and in which a pin 33 is slidably and turnably disposed. The pin 33 is fixed to a crank arm 34 and projects upwardly therefrom. A shaft 35 is journaled in an opening 36, formed in and adjacent the distal end of the lug 30, and the end of the lever arm 34, opposite to the end, adjacent which the pin 33 is disposed, is keyed to the lower end of the shaft 35 for mounting the lever arm 34 on the lower side of the lug 31. A knob 37 is keyed to the upper end of the shaft 35 and is disposed above the upper surface of the lug 31. An indicating pointer 38 is formed integral with the frame 27 and projects outwardly therefrom in opposed relationship to the extension 29 and is turnably positioned against the upper side of a plate 39, which forms a fixed part of reticle holder 15. The portion of the upper side of the plate 39 over which the tapered, pointed end of the indicating pointer 38 is disposed, as seen in Figure 3, is provided with graduations 40 and indicia 41, indicating the values of the graduations 40, which are suitably inscribed thereon. The indicia 41 represent the degrees of lucidity produced by the relative rotation of the polarizing area 24 of the film 23 and the filter 26, as will hereinafter become apparent. The analyzer or filter 26 of the contrast meter attachment 14, as illustrated, is capable of being rotated through an angle of approximately 45° and therefore provides for a contrast range from approximately zero to fifty percent. This rotation of the filter or analyzer 26 is accomplished by rotation of the knob 37 which, through the shaft 35, lever arm 34 and pin 33 oscillates the extension 29 and the frame 27 for oscillating the filter 26 relatively to the reticle 20 so as to turn the filter 26 from a position in which its polarizing axis is parallel to that of the area 24, to a position in which its axis is at an angle of 45° to the axis of the polarizing area 24.

Assuming that the telescope is directed toward a distant object having uniform background such as an aeroplane having a uniform and unrestricted background afforded by the sky, the light rays entering the telescope 8 as indicated by the line 42 in Figure 2, pass through the objective lens 9, through the filter 11 and through the front face of the roof prism 12. The light rays undergo reflection at the two roof surfaces of the prism 12 and emerge from the bottom face thereof and enter the Porro prism 13 directly therebelow. From here the light rays are twice reflected to enter the eyepiece 10 through the filter or analyzer 26 and the reticle 20. The reticle 20 is mounted in the focal plane of the objective lens 9 and the eyepiece 10 and the inverted image of the target, not shown, formed by the objective lens, is inverted in its passage through the prism system, shown in Figure 2, so that an erect image of the target is seen through the eyepiece. This erect image of the aeroplane or target is normally visible in the center of the eyepiece 10 and hence in the center of the reticle 20 or to one side of its polarizing area 24. The contrast between this target and the sky background may be measured by rotating the knob 37 to turn the filter or analyzer 26 from a position in which its axis is parallel to the axis of the polarizing area 24 for varying the brightness of the polarizing area until it matches the apparent brightness of the object or aeroplane. The reading which can then be obtained by the position of the pointer 38 relatively to the dial 40, 41, will constitute the measurement of the contrast of the target relative to the background. With the object or target thus located in close proximity to the polarizing area 24, it will be readily apparent that the operator of the tracking telescope 8 can easily match the brightness, as just previously described, and the extent of orientation of the light-polarizing filter 26, required to match the polarizing area 23 to the target will be indicated by the position of the pointer 38 relatively to the dial 40, 41, so that the information thus obtained can be readily transmitted to the operator of the height finder, not shown, upon which the tracking telescope 8 is mounted and of which it forms a part.

Mechanical means, not shown, could be provided between the shaft 35 and the range measuring mechanism, not shown, of the height finder for automatically introducing a correction for errors in range measurements that are dependent on reduced contrast.

Various modifications and changes in the construction and arrangement of the parts forming the invention are contemplated and may obviously be resorted to without departing from the spirit and scope of the invention as hereinafter defined by the appended claim, as only a preferred embodiment thereof in one of a variety of optical instruments to which the device is adapted has been illustrated and described.

I claim:

A contrast meter attachment for an optical viewing instrument having an objective and an ocular defining a field of view, said attachment comprising a light transmitting element having a light-polarizing area extending over a portion only of the field of view of said instrument as seen through said ocular, an analyzer of polarizing material closely adjacent said element and adapted to extend over the entire field of view of said instrument as seen through said ocular, a frame mounting said analyzer for angular movement relatively to said element to vary the angular relation of the polarizing axes of said area and analyzer, and means for angularly moving said analyzer, said last-named means comprising an extension on said frame having therein a slot extending radially of the optical axis, a lever pivoted on said instrument and having a pin upon its free end engaging said slot, and manually operable means connected to oscillate said lever to thereby proportionally vary the brightness of said area only, while leaving the remaining portion of the field of view unaffected.

GLENN A. FRY.

REFERENCES CITED

The following references are of record in the file of this patent:

UNITED STATES PATENTS

| Number | Name | Date |
|---|---|---|
| 1,525,145 | Ord | Feb. 3, 1925 |
| 2,005,426 | Land | June 18, 1935 |
| 2,435,952 | Bennett | Feb. 17, 1948 |

FOREIGN PATENTS

| Number | Country | Date |
|---|---|---|
| 702,024 | Germany | Jan. 29, 1941 |